US012730971B2

(12) United States Patent
Lee et al.

(10) Patent No.: US 12,730,971 B2
(45) Date of Patent: Sep. 8, 2026

(54) AUTOMATED CAPTIONING OF AUGMENTED REALITY EFFECTS IN VIDEOS

(71) Applicant: Snap Inc., Santa Monica, CA (US)

(72) Inventors: Kwot Sin Lee, Weehawken, NJ (US); Varnith Uttam Chordia, Jersey City, NJ (US); Jacob Assa, New York, NY (US); Maryna Diakonova, Playa Vista, CA (US)

(73) Assignee: SNAP INC., Santa Monica, CA (US)

( * ) Notice: Subject to any disclaimer, the term of this patent is extended or adjusted under 35 U.S.C. 154(b) by 59 days.

(21) Appl. No.: 18/886,733

(22) Filed: Sep. 16, 2024

(65) Prior Publication Data

US 2026/0080168 A1 Mar. 19, 2026

(51) Int. Cl.
*G06T 11/60* (2026.01)
*G06F 40/284* (2020.01)
(Continued)

(52) U.S. Cl.
CPC ............ *G06F 40/284* (2020.01); *G06T 11/60* (2013.01); *G06V 20/46* (2022.01); *G06V 30/10* (2022.01)

(58) Field of Classification Search
CPC ....... G06T 3/00–04; G06T 3/067; G06T 3/08; G06T 3/14; G06T 3/16–20; G06T 3/40; G06T 3/4007; G06T 3/403; G06T 3/4046; G06T 5/00; G06T 5/60; G06T 5/50–94; G06T 7/194; G06T 7/20; G06T 7/215;
(Continued)

(56) References Cited

U.S. PATENT DOCUMENTS 6,717,576 B1 * 4/2004 Duluk, Jr. ............... G06T 11/40 345/506
8,553,037 B2 * 10/2013 Smith ..................... G06T 13/40 345/473
(Continued)

OTHER PUBLICATIONS

Lin Bin et al: "Video-LLaVA: Learning United Visual Representation by Alignment Before Projection", Proceedings of the 2024 Conference on Empirical Methods in Natural Language Processing, Nov. 21, 2023 (Nov. 21, 2023), pp. 5971-5984, XP093341197, DOI: 10.18653/v1/2024.emnlp-main.342 (Year: 2024).*
(Continued)

*Primary Examiner* — Wesner Sajous
(74) *Attorney, Agent, or Firm* — SCHWEGMAN LUNDBERG & WOESSNER, P.A.

(57) ABSTRACT

Described herein are techniques for generating captions for augmented reality (AR) effects in videos using an adapted multimodal large language model (MLLM). The technique involves sampling frames from base and AR-applied videos, combining them into concatenated frames, and processing them with a hybrid vision encoder. Visual tokens are projected into a language model token space, reshaped, downsampled, and interleaved with text tokens. A fine-tuned large language model processes this input sequence to generate AR effect captions. Optical character recognition extracts text from AR frames, which is combined with generated captions and metadata to produce merged captions and content tags. This approach enables accurate description of temporal AR effects and facilitates downstream applications like search and ranking.

20 Claims, 7 Drawing Sheets

(51) Int. Cl.

| | |
|---|---|
| ***G06N 3/08*** | (2023.01) |
| ***G06N 5/04*** | (2023.01) |
| ***G06V 10/82*** | (2022.01) |
| ***G06V 20/40*** | (2022.01) |
| ***G06V 30/10*** | (2022.01) |

(58) Field of Classification Search

CPC .. G06T 7/285; G06T 7/30; G06T 7/38; G06T 9/00; G06T 9/004; G06T 11/60; G06T 13/20; G06T 13/40; G06T 13/80; G06T 15/00; G06T 19/006; G06T 19/20; G06T 2207/10016; G06T 2207/10084; G06T 2207/20081; G06T 2207/20112; G06T 2213/04; G06V 10/82; G06V 20/44; G06V 20/49; G06F 40/284; A63F 13/57; G06N 3/0455; G06N 3/043; G06N 3/045; G06N 3/084; G06N 3/0475; G06N 3/0482; H04N 5/144; H04N 5/147; H04N 5/445; H04N 7/0127; H04N 7/0135; H04N 7/0885; H04N 13/19; H04N 13/161; H04N 13/183; H04N 19/114; H04N 19/132; H04N 19/184–187; H04N 19/25; H04N 19/27; H04N 19/29; H04N 19/46; H04N 19/587; H04N 19/59

See application file for complete search history.

(56) References Cited

U.S. PATENT DOCUMENTS

| | | | | |
|---|---|---|---|---|
| 12,390,738 | B2 * | 8/2025 | Menapace | A63F 13/57 |
| 2025/0191369 | A1 * | 6/2025 | Huang | G06F 40/284 |
| 2025/0335797 | A1 * | 10/2025 | Wang | G06N 5/043 |

OTHER PUBLICATIONS

Maaz Muhammad et al: "Video-ChatGPT: Towards Detailed Video Understanding via Large Vision and Language Models", Proceedings of the 62nd Annual Meeting of the Association for Computational Linguistics (vol. 1: Long Papers), Jun. 10, 2024 (Jun. 10, 2024), pp. 12585-12602, XP093341207, DOI: 10.18653 (Year: 2024).*

Hu, Edward, "Lora: Low-Rank Adaptation of Large Language Models", [Online]. Retrieved from the Internet: <URL: https://arxiv.org/abs/2106.09685>, (Oct. 16, 2021), 26 pgs.

"International Application Serial No. PCT/US2025/045032, International Search Report mailed Dec. 10, 2025", 3 pgs.

"International Application Serial No. PCT/US2025/045032, Written Opinion mailed Dec. 10, 2025", 8 pgs.

Bin, Lin, "Video-LLaVA: Learning United Visual Representation by Alignment Before Projection", Proceedings of The 2024 Conference on Empirical Methods in Natural Language Processing, pp. 5971-5984, [Online]. Retrieved from the Internet: <URL:https://arxiv.org/pdf/2311.10122v2>, (Nov. 21, 2023), 14 pgs.

Cheng, An-Chieh, "Spatialrgpt: Grounded spatial reasoning in vision-language models", Advances in Neural Information Processing Systems 37, 135062-135093, (2024), 25 pgs.

Maaz, Muhammad, "Video-ChatGPT: Towards Detailed Video Understanding via Large Vision and Language Models", Proceedings of the 62nd Annual Meeting of the Association for Computational Linguistics (vol. 1: Long Papers), pp. 12585-12602, [Online]. Retrieved from the Internet: <URL:https://arxiv.org/pdf/2306.05424>, (Jun. 10, 2024), 17 pgs.

Sun, Guangzhi, "video-SALMONN: Speech-Enhanced Audio-Visual Large Language Models", pp. 1-20, [Online]. Retrieved from the Internet: <URL:https://arxiv.org/pdf/2406.15704>, (Jun. 22, 2024), 20 pgs.

Zhao, Yue, "Distilling Vision-Language Models on Millions of Videos", 2024 IEEE CVF Conference on Computer Vision and Pattern Recognition (CVPR), pp. 13106-13116, (Jun. 16, 2024), 11 pgs.

* cited by examiner

AUTOMATED CAPTIONING OF AUGMENTED REALITY EFFECTS IN VIDEOS

TECHNICAL FIELD

The present invention relates generally to the field of computer vision and natural language processing, and more particularly to systems and methods for "understanding" and describing augmented reality (AR) effects in video content using multimodal large language models (MLLMs). Specifically, embodiments of the invention pertain to techniques for generating accurate captions (e.g., text-based descriptions) for AR content in videos by adapting an image-centric MLLM to process multiple video frames, extract temporal information, and generate descriptions that capture dynamic aspects of AR effects across time. This adaptation enables the model to analyze the visual content of video sequences, recognize changes between frames, and produce captions that accurately describe animated effects and transitions in AR-enhanced videos.

BACKGROUND

Augmented Reality (AR) technology has seen rapid adoption in recent years, driven by advancements in mobile devices, computing power, and camera tracking capabilities. AR enables the overlay of digital content onto real-world environments in real time, enhancing user experiences in fields ranging from entertainment and gaming to education, retail, and industrial applications. The ability to integrate virtual objects into physical spaces allows users to interact with both worlds simultaneously, creating immersive and interactive experiences. As AR content has become more sophisticated, the demand for more accurate tracking, responsive interactions, and visually compelling effects has increased. These innovations have spurred the development of new methods for creating, applying, and managing AR content, facilitating its widespread use across various platforms, including mobile applications, smart glasses, and other wearable devices.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Figure 1:
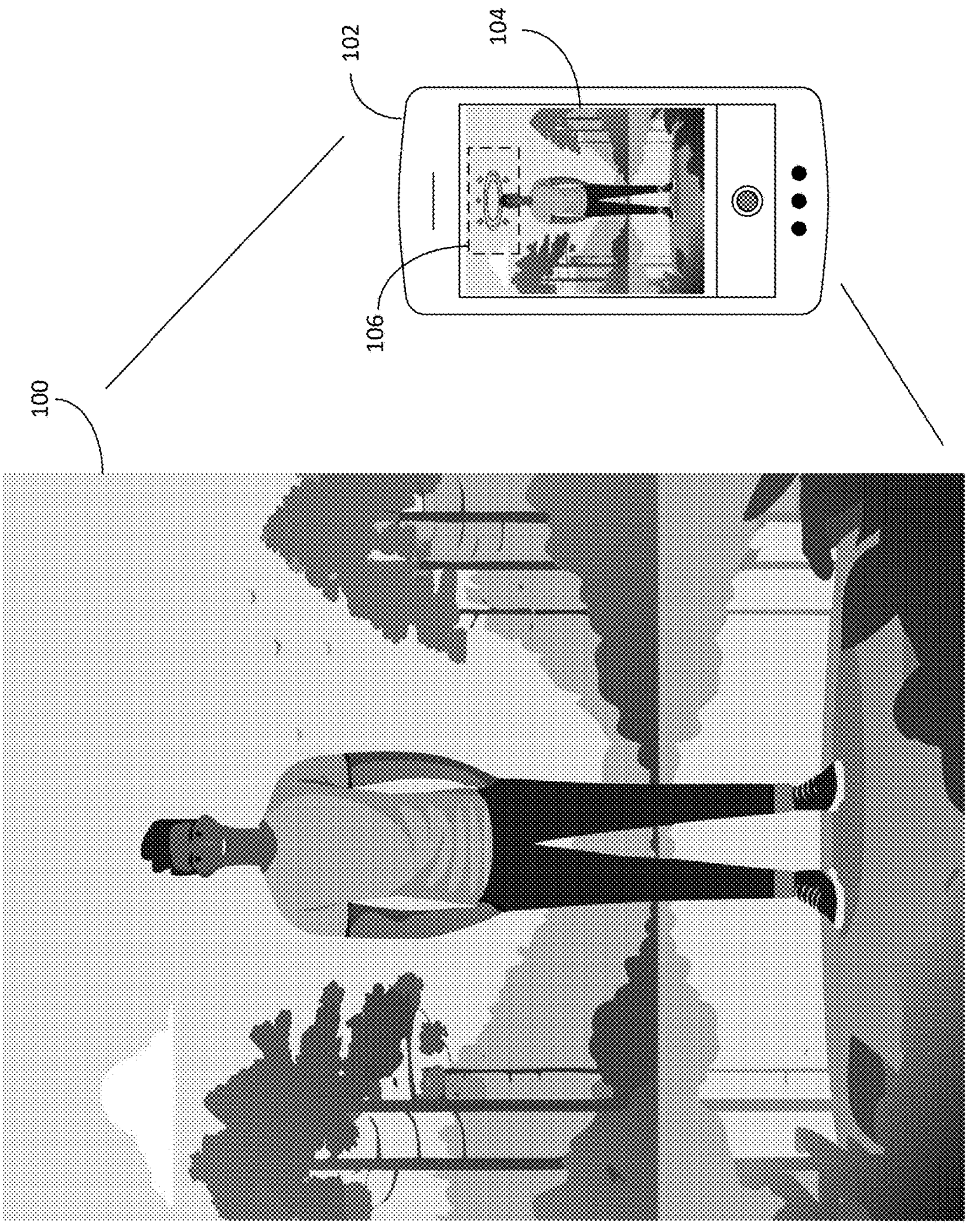
FIG. 1 is a diagram illustrating the application of an augmented reality (AR) effect to a base video using a mobile device, showing both the original scene and the AR-enhanced version, consistent with some examples.

The present disclosure relates to techniques for generating captions and metadata for augmented reality (AR) content using multimodal large language models (MLLMs). By creating captions for AR content, the techniques described herein enable improved content discovery, personalization, and search functionality within AR-rich platforms, ultimately enhancing overall user engagement and experience across a wide range of applications that integrate AR technology. For purposes of explanation, specific technical details are set forth to provide a thorough understanding of the present embodiments. However, it will be apparent to one skilled in the art that the present embodiments may be practiced without these specific details.

The rapid growth of AR technology has led to an explosion in the volume and complexity of AR content, creating significant technical challenges in accurately understanding, describing, and categorizing AR effects as applied to video content. Conventional computer vision models and MLLMs struggle to disentangle AR effects from the underlying base video, often failing to capture the dynamic and interactive nature of AR effects across multiple frames. This limitation stems primarily from these models'inability to effectively isolate and describe the temporal aspects of AR effects, particularly when dealing with subtle alterations that are difficult to distinguish from natural variations in the base content.

The solution to these problems, as set forth in detail below, involves adapting an image-centric MLLM to process multiple video frames, extract temporal information, and generate descriptions that capture dynamic aspects of AR effects across time. This adaptation enables the model to analyze the visual content of video sequences, recognize changes between frames, and produce captions that accurately describe animated effects and transitions in AR-enhanced videos by processing concatenated base and rendered video frames with the modified MLLM, effectively capturing and describing the temporal aspects of AR effects across multiple frames.

AR content and AR effects refer to digital elements superimposed onto real-world imagery or video in real-time, creating an interactive and enhanced version of the physical environment. AR effects can include a wide range of digital overlays such as 3D objects, animations, text, filters, and many others. Mobile applications have made AR technology widely accessible, allowing users to quickly apply AR effects using their device's camera. These applications leverage sophisticated computer vision algorithms to perform real-time tracking of facial features, body movements, or environmental elements. This tracking enables the AR content to be strategically anchored or positioned relative to what is depicted in the real-world scene, creating a seamless blend of digital and physical realities. For example, AR effects can accurately place virtual sunglasses on a user's face, add animated backgrounds that move with the camera, or overlay information onto recognized objects in the environment.

Furthermore, AR effects can be dynamically manipulated based on detecting specific triggers or user interactions. These triggers can include facial expressions, gestures, or body movements captured by the device's camera and processed in real-time. For instance, when a person opens their mouth, the AR effect might activate an animated overlay that appears to emerge from their mouth, such as cartoon speech bubbles or virtual butterflies. Similarly, blinking eyes could trigger a change in the virtual makeup applied to the user's face, instantly switching between different eyeshadow styles or colors. Hand movements can also serve as triggers, allowing users to interact with virtual objects in the scene—for example, a wave of the hand might cause virtual particles to disperse or rearrange. These interactive elements add a layer of engagement and personalization to the AR experience, making the AR effects more dynamic and responsive to user actions. The ability to modify AR effects based on these triggers not only enhances the user experience but also opens up new possibilities for creative expression and interactive storytelling within augmented reality applications.

The ability to easily create and share video content enhanced with AR effects has made this technology particularly popular in social media platforms, where users can express themselves creatively and engage with others through AR-enhanced photos and videos. Additionally, AR has found significant applications in gaming, where it can transform the real world into an interactive playground, and in various other platforms that seek to provide immersive and engaging user experiences. The rapid growth of AR technology has naturally led to an explosion in the volume and complexity of AR content.

FIG. 1 illustrates the simplicity and accessibility of creating AR-enhanced content using modern mobile applications. The left portion of the illustration with reference 100 shows a real-world scene with a young man standing amongst trees, with birds flying in a cloudy sky. On the right, a mobile device 102 is depicted executing an AR application that seamlessly applies AR digital effects to the video stream captured by the camera of the mobile device 102. The user interface 104 displays the base video being captured along with the application of an AR effect 106, specifically a halo of stars circulating around the head of the person. This demonstrates how easily users can transform ordinary scenes into engaging, visually enhanced content using AR technology on their mobile devices.

While not explicitly shown in FIG. 1, the AR application may offer access to hundreds or thousands of user-generated AR effects. These effects may be part of a larger social media ecosystem, where users can create, share, and discover new AR effects. To facilitate easy discovery and application of these effects, the platform may implement a comprehensive taxonomy system. This allows users to search for specific AR effects by categories (e.g., facial features, backgrounds, animations) or attributes (e.g., color schemes, themes, occasions), enabling them to find the perfect effect for their content quickly and efficiently.

This growth in AR content has created significant technical challenges in accurately understanding, describing, and categorizing AR effects applied to base video content. Conventional vision models, which have been effective for static image analysis, face limitations when applied to the dynamic and interactive nature of videos embedded with AR content. Moreover, conventional video-based MLLMs trained specifically for analyzing videos also face significant challenges in accurately analyzing and captioning videos embedded with AR effects, as they struggle to disentangle the AR content or effect from the underlying base video and often fail to capture the dynamic and interactive nature of AR effects across multiple frames. These models, while adept at processing general video content, lack the specialized architecture and training required to effectively isolate and describe the temporal aspects of AR effects, leading to imprecise or incomplete captions that fail to fully capture the nuances of AR-enhanced content.

Figure 2:
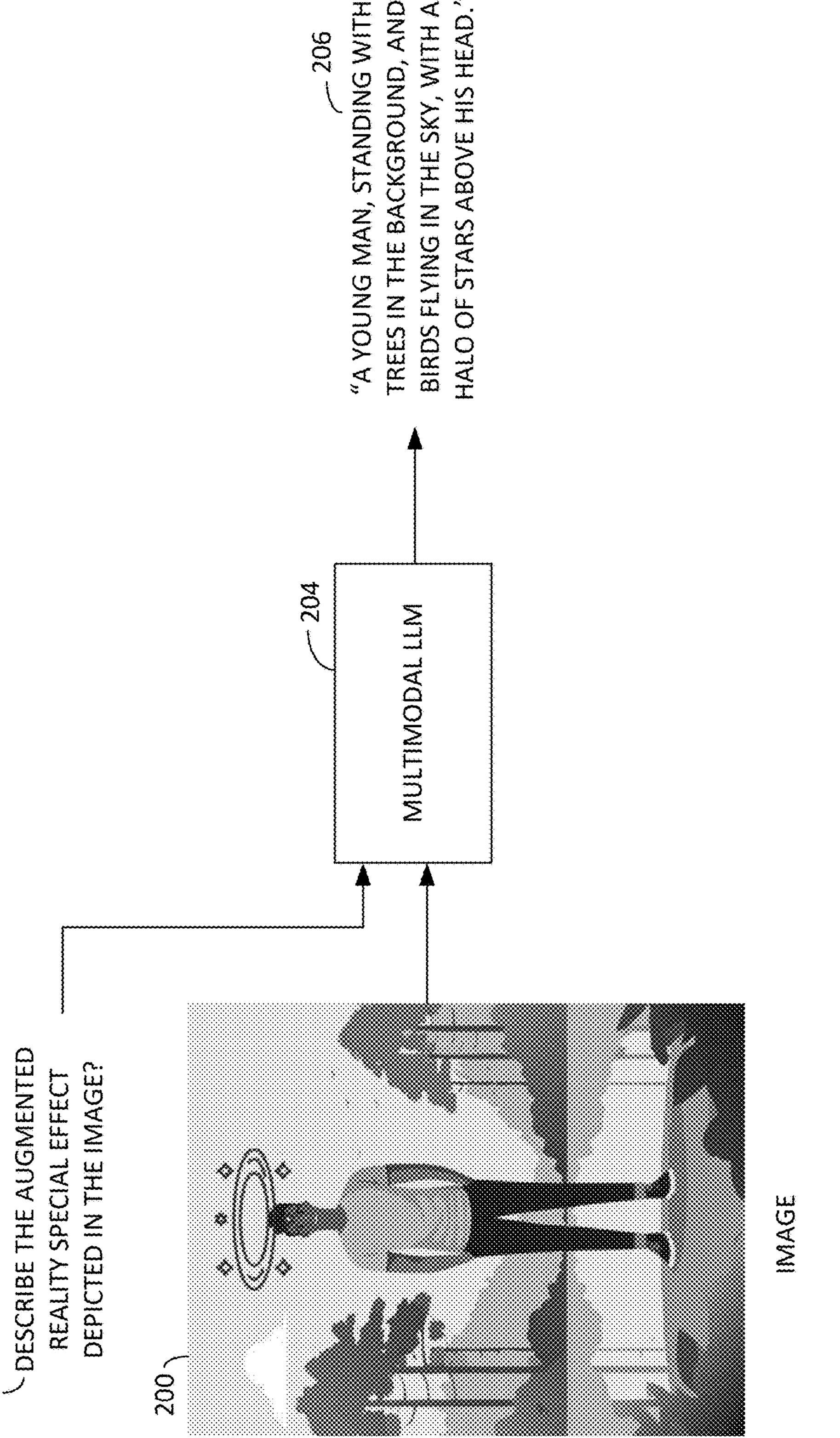
FIG. 2 is a block diagram depicting the limitations of conventional multimodal large language models (MLLMs) in accurately analyzing and captioning videos with AR effects.

FIG. 2 illustrates the limitations of conventional models in accurately analyzing and captioning videos with AR effects. The figure demonstrates how these models struggle to disentangle the AR content from the underlying base video and often fail to capture the dynamic and interactive nature of AR effects across multiple frames.

In this example, an input image with an AR effect 200, which has been extracted from a video as a single frame, is provided to the MLLM 204 along with a text-based instruction 202 directing the MLLM to generate output describing the AR special effect depicted in the image 200. The output 206 generated by the model states: "A young man, standing with trees in the background, and birds flying in the sky, with a halo of stars above his head."

This output highlights several key issues with conventional models:

- Lack of AR effect isolation: The model 204 describes both the base content (young man, trees, birds) and the AR effect (halo of stars) without distinguishing between them.
- Inability to capture temporal aspects: Being limited to a single image input, the model cannot capture any temporal information or movement of the AR effect over time, which is important for understanding dynamic AR effects in videos.
- Incomplete AR effect description: The model provides only a basic description of the AR effect (halo of stars) without detailing its properties, animations, or interactions.
- Overemphasis on base content: The model spends considerable effort describing the background elements (trees, birds) which are part of the base video rather than focusing on the AR effect itself.

This example demonstrates the technical challenge faced by conventional MLLMs in accurately understanding and describing AR effects in videos. It underscores the need for a specialized approach that can effectively isolate AR effects from the base content, capture their temporal and interactive aspects, and generate precise, focused descriptions of the AR elements without being distracted by the underlying video content.

The technical challenge in accurately analyzing and describing AR effects in videos stems from the intricate blending of digital elements with real-world imagery. Conventional vision models and video-based MLLMs struggle to disentangle AR effects from the underlying base video content, particularly when dealing with subtle alterations. These nuanced changes, such as slight variations in color or texture mimicking makeup or small graphical overlays, are often indistinguishable from natural variations in lighting or skin texture in the base video. This similarity necessitates a more sophisticated approach capable of detecting and describing AR effects with precision, without misattributing them to the base content or overlooking them entirely. The challenge is further compounded by the need to capture the dynamic and interactive nature of AR effects across multiple frames while ignoring irrelevant aspects of the base video content.

The technical challenge in accurately analyzing and describing augmented reality (AR) effects in videos requires sophisticated reasoning about how an effect is applied while simultaneously ignoring the base content. This involves a nuanced understanding of the AR application process and the ability to focus solely on the transformative elements introduced by the AR effect.

The model must be capable of discerning the precise location and nature of the AR effect in relation to the base video content. For example, when describing an AR effect that applies a tattoo, the model needs to accurately identify whether the tattoo is applied to the face, arm, or another body part. This level of specificity extends to understanding the logic behind the AR effect's application, such as recognizing that animal ears are added to the top of a person's head or that a filter changes the color of specific facial features.

Furthermore, the model must be able to capture the dynamic and interactive nature of AR effects across multiple frames, describing how they may change or animate over time. This could include effects that are triggered by specific user actions, such as opening one's mouth or blinking, which adds another layer of complexity to the reasoning process.

The solution must also be scalable and efficient, capable of processing large volumes of AR content without requiring extensive computational resources or time. This is particularly crucial given the rapid pace at which new AR content is created and shared on social media platforms, necessitating a system that can quickly and accurately analyze and describe a wide variety of AR effects.

The present disclosure sets forth a technical solution to the aforementioned technical problems by introducing an improved approach for generating accurate captions for AR effects as applied to videos using an adapted MLLM. This system addresses the technical challenge of disentangling AR effects from base video content, a task that conventional computer vision models and video-centric MLLMs struggle with due to the intricate blending of digital elements with real-world imagery.

Consistent with some examples, the technique employs a multi-step process that effectively separates AR effects from base content. The system begins by sampling N frames from both the base video and the corresponding video with AR effects applied. These frames are then combined into N concatenated frames, where each frame consists of a base video frame positioned side-by-side with its AR-enhanced counterpart. This concatenation process allows the model to simultaneously analyze both the original content and the applied AR effect.

The concatenated frames are processed using a hybrid vision encoder, which produces visual tokens. This encoder is designed to capture both global and local semantic understanding of the AR effects. The visual tokens are then projected into the language model token space, reshaped, and spatially downsampled to optimize processing.

One aspect of the approach involves the interleaving of the downsampled visual tokens with text tokens to form an input sequence. This sequence is then processed using a fine-tuned large language model to generate a caption that accurately describes the AR effect applied to the base video. The system is capable of focusing solely on the AR effects while ignoring irrelevant aspects of the base video content.

The model training techniques employed in this system significantly enhance its ability to accurately caption AR effects in videos. These techniques are designed to address the unique challenges posed by AR content and improve the overall performance of the MLLM.

One aspect involves the implementation of masked prompt training, which utilizes a Prefix-LM style of loss prediction. This approach computes loss only for the predicted captions, ignoring the prompt or instruction tokens. By focusing the model's attention solely on generating accurate captions for AR effects, this technique significantly improves the system's ability to disentangle AR content from the base video, resulting in more precise and relevant descriptions.

Another aspect of the technique is the incorporation of End-of-Sentence (EOS) token prediction into the loss function. This addition is important for generating coherent and concise captions, as it teaches the model to determine when to stop generating text. By preventing repetitive or hallucinated content, EOS token prediction contributes to more accurate and focused descriptions of AR effects.

To optimize processing efficiency, particularly when dealing with sequences of varying lengths, the system employs dynamic padding instead of fixed-length truncation. This approach minimizes the number of padding tokens per batch, allowing for more efficient training and inference. Dynamic padding is especially beneficial in the context of video processing, where frame sequences can vary significantly in length.

The system also leverages Low-Rank Adaptation (LoRA) for efficient fine-tuning of the large language model. LoRA enables rapid adaptation to new types of AR effects without requiring extensive computational resources or modifying the original model weights. This technique is particularly valuable in the fast-paced field of AR content creation, as it allows the system to quickly incorporate new AR-specific knowledge while preserving the model's general capabilities.

Collectively, these training techniques enable the system to effectively separate AR effects from base video content, capture the temporal aspects of AR effects, and generate accurate descriptions while maintaining efficiency and scalability. The combination of these approaches results in a robust and adaptable system capable of handling the complex and dynamic nature of AR content in videos.

To further enhance the accuracy and comprehensiveness of the generated captions, in some examples, the system incorporates additional steps such as optical character recognition (OCR) to extract text from the AR-applied frames. The system then combines the generated caption, OCR text, and metadata using a generative language model to produce a merged caption and content tags. Furthermore, in some examples, the system generates word embeddings from the captions, which can be used for various downstream applications such as similar AR effect retrieval, improved search indexing, and enhanced recommendation systems.

This approach not only effectively addresses the challenge of accurately describing AR effects in videos but also opens up new possibilities for more meaningful and personalized AR content management. The system's ability to capture the dynamic and interactive nature of AR effects across multiple frames, while maintaining efficiency and scalability, makes it a significant advancement in the field of AR content analysis and description. Other aspects and advantages of the techniques set forth herein will be apparent from the detailed description of the several figures that follows.

Figure 3:
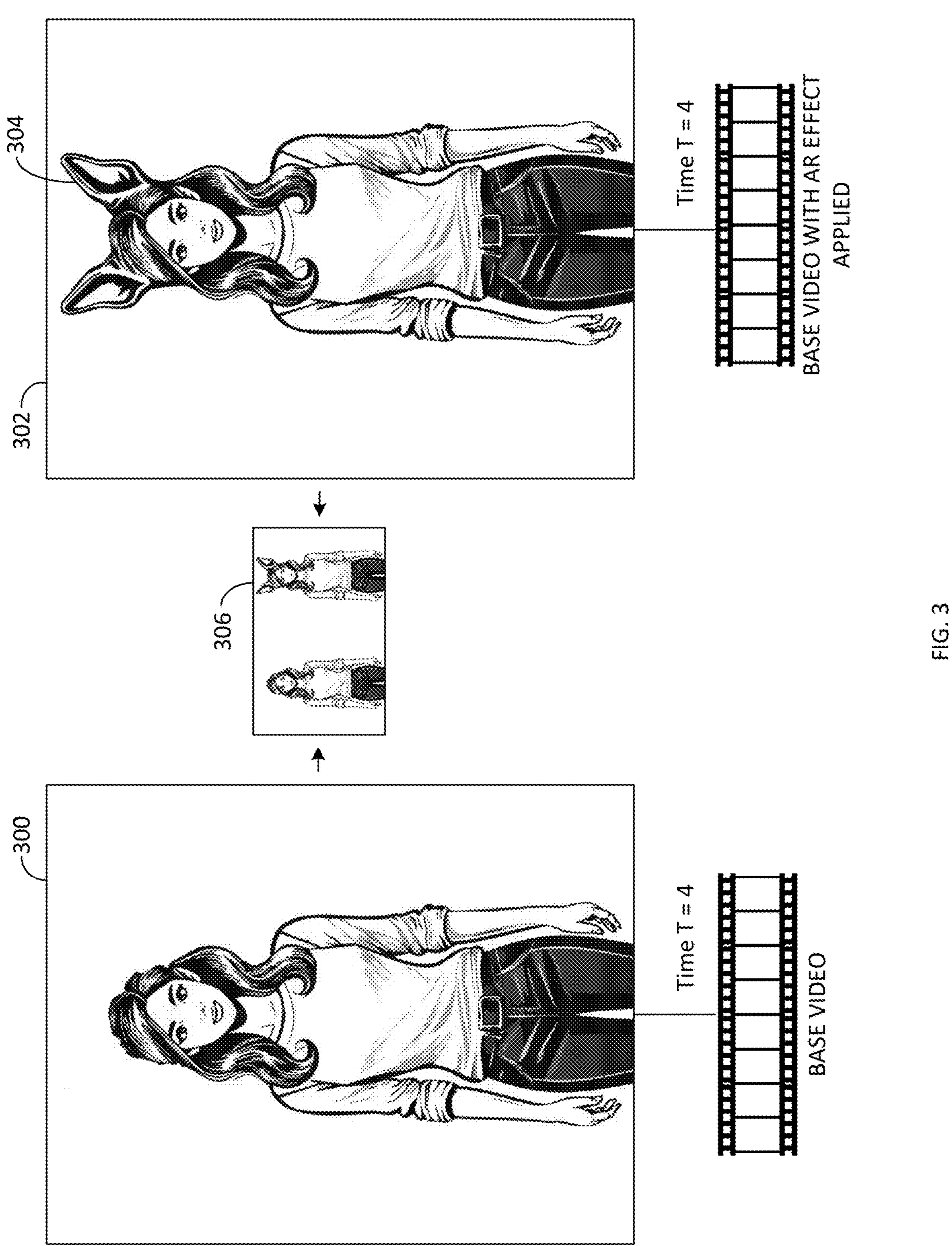
FIG. 3 is a diagram illustrating the process of creating concatenated frames from a base video and a video with an AR effect applied, consistent with some examples.

FIG. 3 is a diagram illustrating the process of creating concatenated frames from a base video and a video with an AR effect applied, consistent with some examples. The figure shows two images, representing individual frames that have been extracted from corresponding videos: a base video frame 300 and a corresponding frame with an AR effect applied 302. Both frames represent the same point in time within their respective videos, denoted as "Time T=4" in the figure. This temporal alignment allows for accurately capturing the AR effect's impact on the original content.

In this example, the AR effect 304 comprises a set of animal ears overlaid on the image of a person. This illustrates how AR effects can modify or enhance the original video content in various ways, such as adding virtual objects or altering facial features.

As illustrated in FIG. 3, one aspect of the technique set forth herein involves the creation of a concatenated frame 306, which combines the base video frame 300 and the AR-enhanced frame 302 side-by-side. This concatenation process allows the MLLM to simultaneously analyze both the original content and the applied AR effect.

To capture the temporal aspects of video content and AR effects, the system samples multiple pairs of frames from the base video and the AR-enhanced video. This sampling process, while not explicitly shown in FIG. 3, is important for enabling the model to "understand" dynamic AR effects that may change or animate over time.

By creating these concatenated frames for multiple time points throughout the video, the system can provide the MLLM with a comprehensive view of how the AR effect evolves and interacts with the base content over time. This approach enables the MLLM to generate more accurate and detailed captions that describe not only the presence of AR effects but also their dynamic behavior and temporal characteristics.

The sampling of video frames can be performed using various techniques to effectively capture the AR effects while maintaining efficiency. One approach is to sample frames at regular intervals, such as every N frames, to provide a uniform representation of the video's timeline. This method ensures consistent coverage but may miss rapid or subtle changes in the AR effect.

A more sophisticated approach involves analyzing the pixel-wise differences between consecutive frames to identify significant changes. This technique, can be implemented as follows:

Initialize a random convolutional neural network (CNN) to capture basic 2D statistics of frames.

Use the CNN to process both the base and rendered frames, capturing their feature statistics.

Compute a difference score between corresponding base and rendered frames using cosine similarity of the captured statistics.

Select frame pairs with difference scores within a predetermined range, indicating significant changes in the AR effect.

This adaptive sampling method focuses on frames where the AR effect is most prominent or undergoes significant changes, potentially capturing more informative frames for analysis. It can be particularly effective for AR effects that are triggered by specific user actions or have dynamic elements that change over time.

Additionally, the system could employ a hybrid approach, combining regular interval sampling with the difference-based method. This would ensure a baseline coverage of the entire video while also capturing key moments of AR effect changes. The sampling process can be further optimized by considering the nature of specific AR effects. For instance, for effects that are known to be triggered by facial movements, the system could prioritize sampling frames where facial landmarks indicate significant changes.

By employing these advanced sampling techniques, the system can create a set of concatenated frames that effectively represent the AR effect's behavior throughout the video, enabling the multimodal large language model to generate more accurate and detailed captions.

The concatenated frame approach addresses the technical challenge of disentangling AR effects from base video content, which has been a significant limitation of conventional computer vision models and video-centric MLLMs. By presenting both the original and AR-enhanced frames side-by-side, the system provides the MLLM with explicit information about what has been added or modified by the AR effect, facilitating more precise and focused descriptions of the AR elements.

Figure 4:
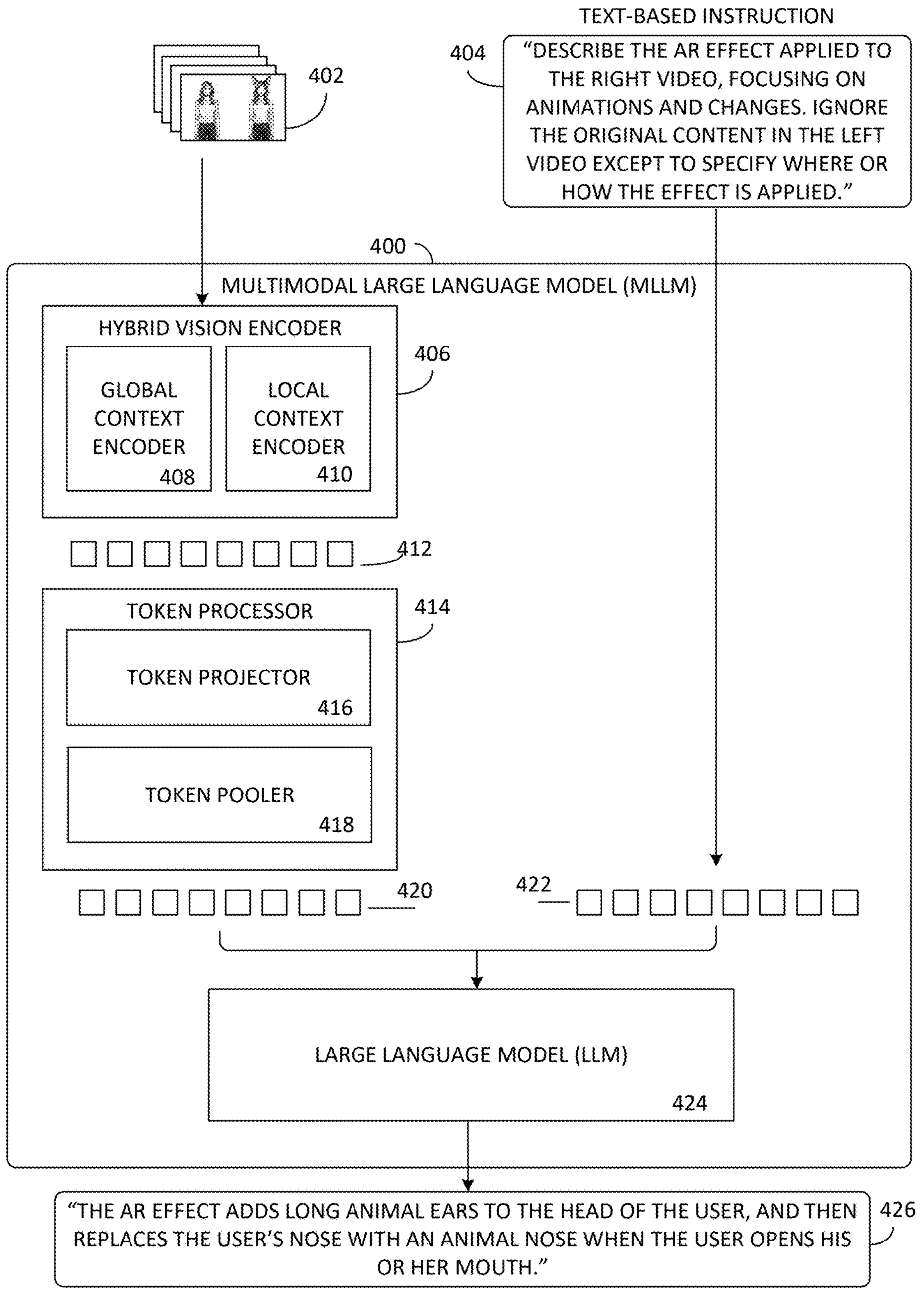
FIG. 4 is a block diagram illustrating the architecture of an MLLM, adapted for generating captions for AR effects applied to videos, including components such as the hybrid vision encoder, token processor, and large language model, consistent with some examples.

FIG. 4 is a block diagram illustrating the architecture of an MLLM 400 adapted for generating captions for videos with AR effects, including components such as the hybrid vision encoder 406, token processor 414, and large language model 424, consistent with some examples. As shown in FIG. 4, the MLLM 400 is designed to process both visual data 402 and textual data 404 to generate accurate descriptions of AR effects in videos. The MLLM 400 comprises several components that work in concert to analyze the input and produce relevant captions.

The MLLM 400 operates by processing multiple concatenated frames 402 from a video, where each concatenated frame combines a frame from the base video and a corresponding frame from the video with the AR effect applied, both representing the same point in time. This approach allows the model to directly compare the original content with the AR-enhanced version. Along with these concatenated frames, the MLLM receives a text-based instruction 404 directing it to describe the AR effect. The hybrid vision encoder 406 processes these concatenated frames to generate visual tokens 412, capturing both global and local semantic understanding of the AR effect applied to the base video. This process enables the model to effectively differentiate between the original content and the applied AR effects across multiple frames. The visual tokens 412 are then processed by the token processor 414, which includes a token projector 416 that maps the visual tokens 412 into the language model's token space, and a token pooler 418 that condenses the information to manage the model's context length limitations. This processing allows the MLLM 400 to efficiently handle the temporal aspects of the AR effects while maintaining a comprehensive understanding of the visual content. The text-based instruction 404 is converted into text tokens 422, which are then interleaved with the processed visual tokens 420 to form an input sequence for the large language model (LLM) 424. This fine-tuned LLM 424 processes the combined input sequence to generate a caption 426 that accurately describes the AR effect applied to the base video. The generated caption focuses on the nature of the effect, including its temporal aspects, and explains how the effect relates to the base video in terms of where it is presented or when it appears (e.g., triggering events). This approach enables the MLLM 400 to capture and describe dynamic AR effects across multiple frames, providing detailed and relevant descriptions of the AR content while ignoring irrelevant aspects of the original content.

The training of the MLLM for generating captions for videos with AR effects involves three main stages, each designed to progressively enhance the model's ability to understand and describe complex visual and textual data. In the first stage, the token projector 416, which is part of the token processor 414, is trained using high-quality image-text data. This stage focuses on teaching the projector to effectively map visual tokens 412 into the language model's token space, enabling the model 400 to understand semantic relationships between visual and textual information. The second stage involves joint vision-language pre-training, where the model is exposed to a diverse set of datasets containing interleaved text and images, similar to the structure found in web pages. This stage helps the model adapt to understanding multimodality in various contexts, improving its ability to process complex inputs.

The final stage involves supervised fine-tuning (SFT), allowing for adapting the model 400 to the specific task of AR effect captioning. During this stage, the LLM, token projector 416, and vision encoders 408 and 410 are all trained together using data that closely resembles the inference data. The training data consists of pairs of concatenated frames and corresponding human-labeled captions, where the concatenated frames include both base video frames and their AR-enhanced counterparts. This approach allows the model 400 to learn the nuanced differences between original content and applied AR effects.

The training process incorporates several optimization techniques to enhance performance and efficiency. Masked prompt training, using a Prefix-LM style of loss prediction, computes loss only for the predicted captions and not for the prompt or instruction tokens. This technique significantly improves the model's ability to disentangle AR content from the base video, resulting in more precise and relevant descriptions. End-of-Sentence (EOS) token prediction is included in the loss function, which is crucial for generating coherent and concise captions. This addition teaches the model to determine when to stop generating text, preventing repetitive or hallucinated content.

To optimize processing efficiency, particularly when dealing with sequences of varying lengths, the system employs dynamic padding instead of fixed-length truncation. This approach minimizes the number of padding tokens per batch, allowing for more efficient training and inference. Additionally, LoRA is used for efficient fine-tuning of the large language model. LoRA enables rapid adaptation to new types of AR effects without requiring extensive computational resources or modifying the original model weights.

The training process utilizes a causal attention mask with a prefix for the visual tokens and instruction tokens, and computes loss only for the predicted caption tokens. This approach focuses the model's attention on generating accurate captions for AR effects while maintaining efficiency and scalability. By combining these advanced training stages and optimization techniques, the system achieves a high level of accuracy in captioning AR effects in videos, effectively addressing the technical challenges of separating AR content from base videos and capturing the dynamic nature of AR effects across multiple frames.

In one example implementation of the system for generating captions for videos with AR effects, the MLLM utilizes the Deepseek-VL architecture as a foundation. This implementation adapts Deepseek-VL, which was originally designed for image understanding, to process video content. It is important to note that this is just one possible implementation, and the claimed invention is not limited to this specific model or architecture.

In this example, the hybrid vision encoder comprises two components: SigLIP and SAM-B models SigLIP is trained on diverse text-image data and accepts low-resolution inputs (384×384), while SAM-B takes high-resolution inputs (1024×1024) and is trained on high-quality segmentation datasets. This combination allows for both global and local semantic understanding of the visual content.

The hybrid vision encoder in this implementation produces 576 tokens for an image with 1K resolution. After projection into the language model's token space, these tokens are reshaped from a one-dimensional representation (N, 576, 4096) to a two-dimensional representation (N, 24, 24, D), where N is the number of frames and D is the token dimension. The tokens are then spatially downsampled by a factor of 2, resulting in (N, 12, 12, D) before being reshaped back to (N, 144, D). This downsampling process reduces the number of visual tokens per frame from 576 to 144, which allows for managing the model's context length limitations and ensuring efficient processing.

The LLM component in this example has a context length of 4K tokens. The downsampling of visual tokens allows for processing multiple frames while staying within this context limit. The exact number of frames (N) that can be processed depends on the specific implementation and available computational resources.

For training, this implementation uses the three-stage process described above: (1) training the Vision-Language Adapter (token projector), (2) joint vision-language pre-training, and (3) supervised fine-tuning. The training data consists of pairs of concatenated frames and corresponding human-labeled captions.

It is important to emphasize that while this example provides specific details about model architectures, token numbers, and training stages, these are not limiting factors for the claimed invention. The core concepts of processing concatenated video frames, using a hybrid vision encoder, downsampling tokens, and generating captions focused on AR effects can be implemented using various model architectures, token numbers, and training methodologies.

Figure 5:
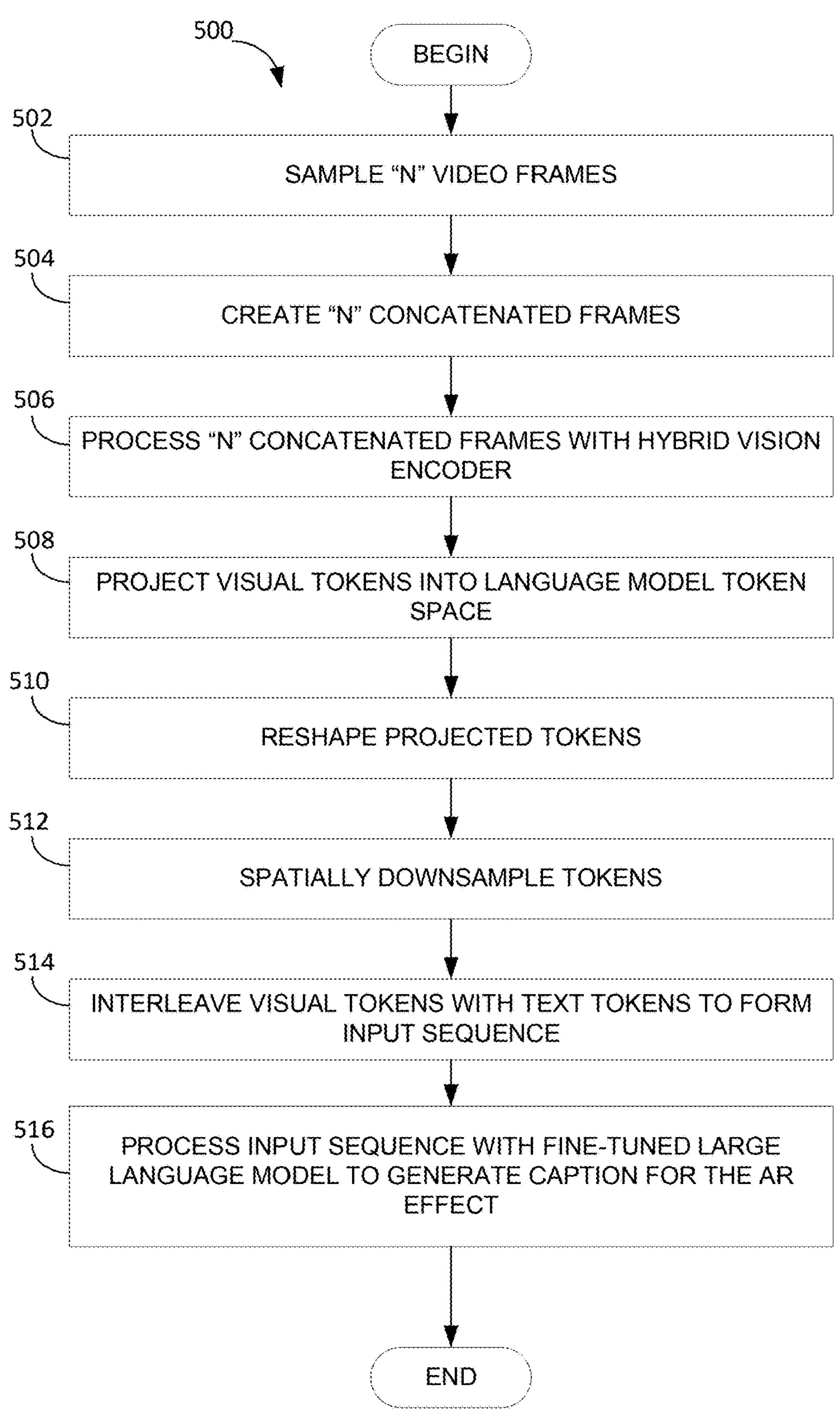
FIG. 5 is a flowchart illustrating a method for generating a caption for an AR effect as applied to a base video, including steps for sampling video frames, creating concatenated frames, processing with a hybrid vision encoder, and generating captions using a fine-tuned large language model, consistent with some examples.

FIG. 5 illustrates a method 500 for generating a caption to describe an AR effect that has been applied to a video, where the caption is generated using a MLLM. The method begins at operation 502 with sampling "N" video frames from both the base video and the corresponding video with the AR effect applied, where each pair of frames represents the same point in time. This step allows the model to capture the temporal aspects of the AR effect across multiple frames.

At operation 504, "N" concatenated frames are created by combining each pair of sampled frames, positioning the base video frame and the corresponding AR-enhanced frame side by side. This concatenation process enables the model to directly compare the original content with the AR-enhanced version, facilitating better understanding of the applied effect.

Next, at operation 506, the "N" concatenated frames are processed with a hybrid vision encoder to produce visual tokens. The hybrid vision encoder, which may comprise a global context encoder, and a local context encoder in some implementations, captures both global and local semantic understanding of the AR effect applied to the base video.

At operation 508, the visual tokens are then projected into the language model token space. This step maps the visual information into a form that can be processed by the LLM, allowing for integration of visual and textual data.

At operation 510, the projected tokens are reshaped from a one-dimensional representation to a two-dimensional representation. This reshaping process prepares the tokens for subsequent spatial downsampling.

Spatial downsampling of the reshaped projected tokens occurs at operation 512 and is performed to reduce the number of tokens per frame, which is important for managing the model's context length limitations and ensuring efficient processing.

Next, at operation 514, the process involves interleaving the downsampled visual tokens with text tokens to form an input sequence. The text tokens may include instructions directing the model to describe the AR effect, focusing on animations and changes while ignoring irrelevant aspects of the original content.

Finally, at operation 516, the input sequence is processed using a fine-tuned large language model to generate a caption for the AR effect. This step produces a detailed description of the AR effect, capturing its nature, temporal aspects, and how it relates to the base video in terms of where it is presented or when it appears.

The system can incorporate additional processing steps after generating the initial caption to enhance the accuracy and comprehensiveness of the AR effect description. One such step involves extracting text from one or more frames of the video with the AR effect applied using optical character recognition (OCR). This OCR process can capture any text that is part of the AR effect, which may not be fully described by the visual analysis alone.

After generating the initial caption and extracting OCR text, the system can employ a generative language model to combine this information with metadata related to the AR effect. This process produces a merged caption and content tags that provide a more comprehensive description of the AR effect. The merged caption incorporates relevant details from all available sources, while the content tags highlight the most salient terms, making the information more accessible for downstream applications.

To further enhance the utility of the generated captions, the system can create word embeddings using a text encoder. These embeddings are numerical representations of the caption text that capture semantic relationships between words and phrases. The resulting embeddings can be stored in a database for various downstream applications.

The generated captions and their associated embeddings have numerous practical applications in AR-related systems. For example, they can be used to retrieve similar AR effects based on caption similarity, enabling more effective content discovery and recommendation systems. The captions and embeddings can also significantly improve AR effect search indexing, allowing users to find relevant AR effects more easily using natural language queries.

Furthermore, the caption data can enhance AR effect ranking in recommendation systems, providing a more nuanced understanding of each effect's content and characteristics. This can lead to more personalized and contextually relevant AR effect suggestions for users. The captions can also be utilized in content moderation systems, helping to identify and categorize AR effects based on their described features and potential use cases.

In the context of social media and messaging applications, these enhanced captions can improve the discoverability and shareability of AR effects, potentially increasing user engagement and interaction with AR content. The system's ability to capture and describe temporal aspects of AR effects, such as animations or dynamic elements, can be particularly valuable for video-based AR applications, enabling more accurate recommendations and search results for complex, multi-frame effects.

These techniques aim to enhance the understanding and description of AR effects in video content. The described techniques are particularly applicable and beneficial to applications that leverage AR content in messaging and other communication mechanisms, such as social media feeds. The techniques set forth herein can significantly enhance user experiences across various platforms where AR effects are widely used for personal expression and communication. The techniques can improve messaging applications where users apply AR effects to video-based messages, social media platforms incorporating AR content in user-generated posts and stories, interactive games featuring real-time AR effects and video interactions, e-commerce applications utilizing AR for virtual try-ons or product visualizations, and educational platforms incorporating AR content for interactive learning experiences. By accurately describing and categorizing AR effects, these techniques enable improved content discovery, personalization, and search functionality within AR-rich communication and entertainment platforms, ultimately enhancing overall user engagement and experience across a wide range of applications that integrate AR technology.

Machine Architecture

Figure 6:
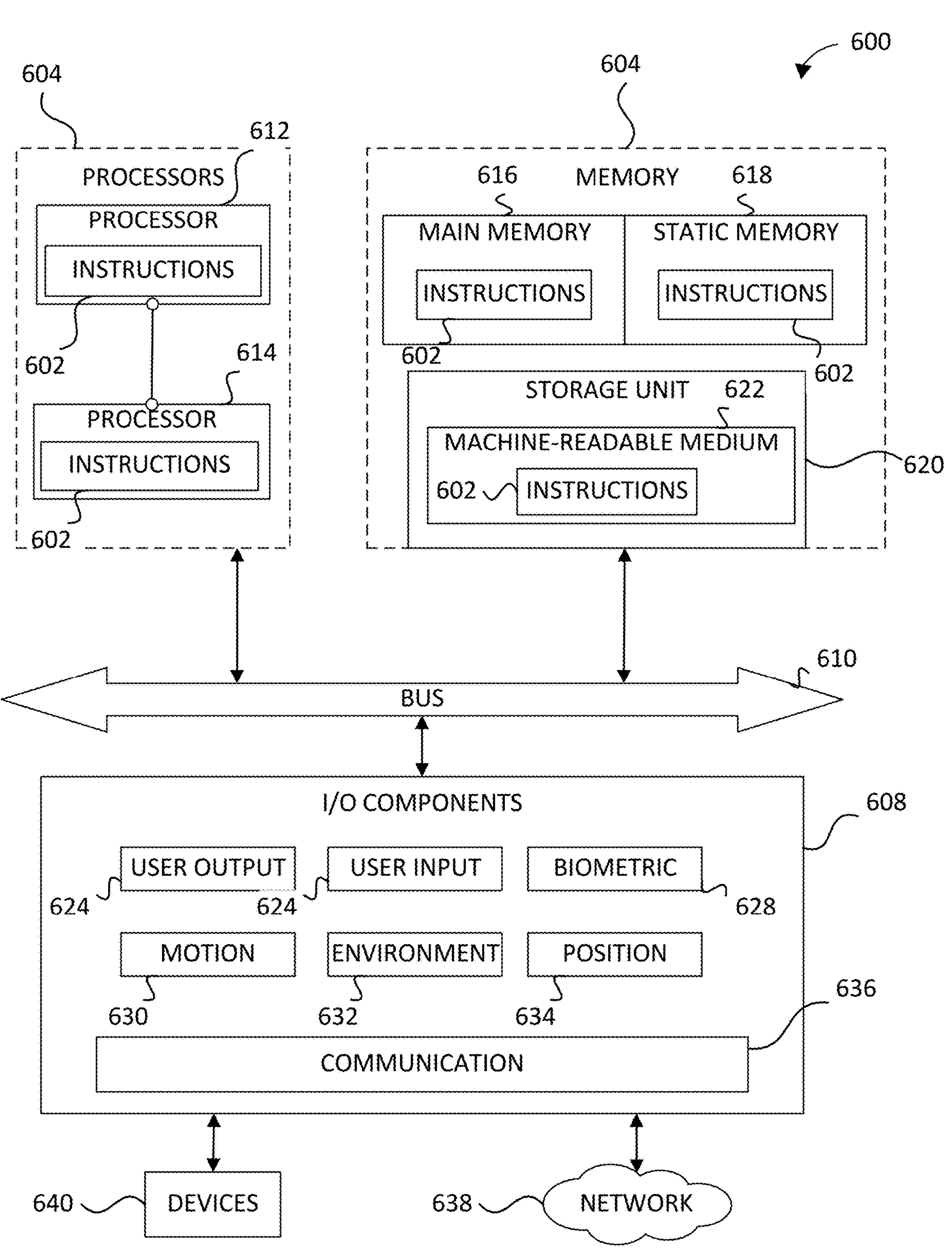
FIG. 6 is a block diagram illustrating the hardware architecture of a computing device capable of implementing the AR effect captioning system, including processors, memory, storage, and I/O components, consistent with some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise a user system or any one of multiple server devices forming part of a server system. In some examples, the machine 600 may also comprise both client and server systems, with certain operations of a particular method or algorithm being performed on the server-side and with certain operations of the method or algorithm being performed on the client-side.

The machine 600 may include processors 604, memory 606, and input/output I/O components 608, which may be configured to communicate with each other via a bus 610.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, a user system may have a camera system comprising, for example, front cameras on a front surface of the user system and rear cameras on a rear surface of the user system. The front cameras may, for example, be used to capture still images and video of a user of the user system (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
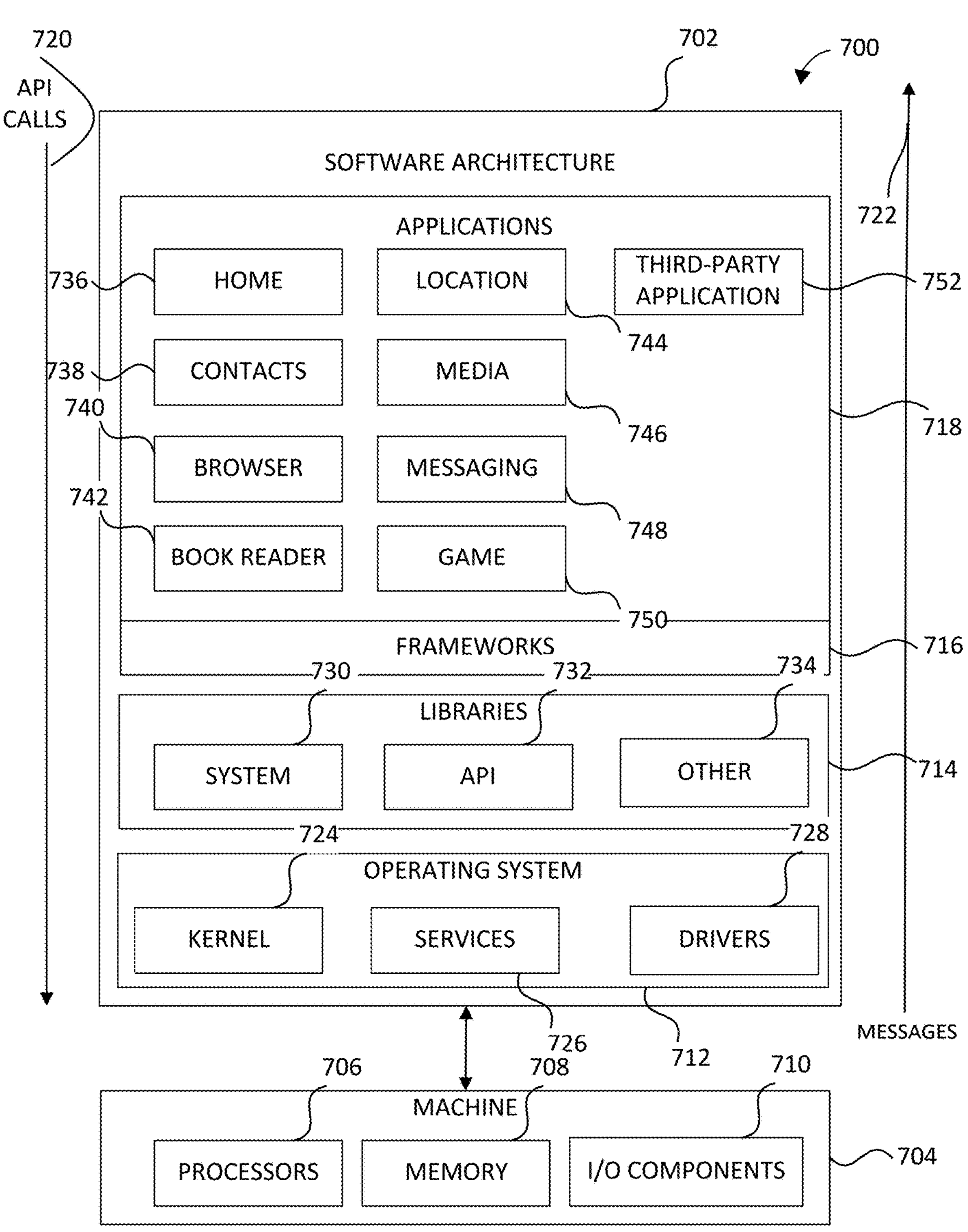
FIG. 7 is a block diagram depicting the software architecture of a computing device, showing various applications, frameworks, and system components relevant to the AR effect captioning system, consistent with some examples.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematical functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application 752 can invoke the API calls 720 provided by the operating system 712 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

Example 1 is a method for generating a caption for a video with an augmented reality (AR) effect, the method comprising: sampling N frames from a base video and N corresponding frames from the base video with the AR effect applied to form N pairs of frames, wherein each pair of frames represents the same point in time; combining each pair of frames in the N pairs of frames into a concatenated frame to form N concatenated frames, each concatenated frame formed by positioning, side by side, a base video frame and a corresponding frame from the base video with the AR effect applied; processing the N concatenated frames with a vision encoder to produce visual tokens; projecting the visual tokens into a language model token space to derive projected tokens; reshaping the projected tokens from a one-dimensional representation to a two-dimensional representation; spatially downsampling the reshaped projected tokens to derive downsampled tokens; interleaving the downsampled tokens with text tokens to form an input sequence; processing the input sequence using a large language model to generate a caption describing the AR effect applied to the base video.

In Example 2, the subject matter of Example 1 includes, wherein processing the N concatenated frames with a vision encoder comprises: processing the N concatenated frames using a hybrid vision encoder having a first component trained on diverse text-image data that accepts low resolution inputs and a second component trained on high-quality segmentation datasets that accepts high resolution inputs; wherein the hybrid vision encoder captures both global and local semantic understanding of the AR effect applied to the base video.

In Example 3, the subject matter of Examples 1-2 includes, wherein processing the input sequence using the large language model comprises: processing the input sequence using a causal attention mask with a prefix; generating the caption by predicting tokens only for a portion of the input sequence representing the caption; and predicting an end-of-sentence token to determine when to stop generating the caption.

In Example 4, the subject matter of Examples 1-3 includes, wherein interleaving the downsampled tokens with text tokens to form an input sequence comprises: including a text instruction that directs the large language model to: compare the base video frame and the corresponding frame with the AR effect applied in each concatenated frame; focus on describing the AR effect visible in the frame with the AR effect applied; provide a detailed description of any animations or dynamic elements of the AR effect; and exclude descriptions of content present in the base video frame unless it relates to a location where the AR effect is applied.

In Example 5, the subject matter of Examples 1-4 includes, extracting text from at least one of the N frames from the base video with the AR effect applied using optical character recognition (OCR); and combining the generated caption, the OCR text, and metadata related to the AR effect, using a generative language model to produce a merged caption and content tags for the AR effect.

In Example 6, the subject matter of Examples 1-5 includes, generating word embeddings from the generated caption using a text encoder; storing the word embeddings in a database; and using the word embeddings for at least one of: retrieving similar augmented reality effects based on caption similarity, improving augmented reality effect search indexing, or enhancing augmented reality effect ranking in recommendation systems.

In Example 7, the subject matter of Examples 1-6 includes, training the large language model, wherein the training of the large language model comprises: providing training data comprising pairs of concatenated frames and corresponding human-labeled captions; processing the concatenated frames with the vision encoder to produce visual tokens; projecting the visual tokens into the language model token space to derive projected tokens; interleaving the projected tokens with text tokens representing instructions and captions to form input sequences; processing the input sequences using the large language model; computing a loss function for the large language model, wherein the loss function: uses a causal attention mask with a prefix for the visual tokens and instruction tokens; and computes loss only for predicted caption tokens and not for the instruction or visual tokens; and updating parameters of the large language model based on the computed loss to improve caption generation performance.

Example 8 is a system for generating a caption for a video with an augmented reality (AR) effect, the system comprising: at least one processor; and at least one memory storage device storing instructions thereon, which, when executed by the at least one processor, cause the system to perform operations comprising: sampling N frames from a base video and N corresponding frames from the base video with the AR effect applied to form N pairs of frames, wherein each pair of frames represents the same point in time; combining each pair of frames in the N pairs of frames into a concatenated frame to form N concatenated frames, each concatenated frame formed by positioning, side by side, a base video frame and a corresponding frame from the base video with the AR effect applied; processing the N concatenated frames with a vision encoder to produce visual tokens; projecting the visual tokens into a language model token space to derive projected tokens; reshaping the projected tokens from a one-dimensional representation to a two-dimensional representation; spatially downsampling the reshaped projected tokens to derive downsampled tokens; interleaving the downsampled tokens with text tokens to form an input sequence; processing the input sequence using a large language model to generate a caption describing the AR effect applied to the base video.

In Example 9, the subject matter of Example 8 includes, wherein processing the N concatenated frames with a vision encoder comprises: processing the N concatenated frames using a hybrid vision encoder having a first component trained on diverse text-image data that accepts low resolution inputs and a second component trained on high-quality segmentation datasets that accepts high resolution inputs; wherein the hybrid vision encoder captures both global and local semantic understanding of the AR effect applied to the base video.

In Example 10, the subject matter of Examples 8-9 includes, wherein processing the input sequence using the large language model comprises: processing the input sequence using a causal attention mask with a prefix; generating the caption by predicting tokens only for a portion of the input sequence representing the caption; and predicting an end-of-sentence token to determine when to stop generating the caption.

In Example 11, the subject matter of Examples 8-10 includes, wherein interleaving the downsampled tokens with text tokens to form an input sequence comprises: including a text instruction that directs the large language model to: compare the base video frame and the corresponding frame with the AR effect applied in each concatenated frame; focus on describing the AR effect visible in the frame with the AR effect applied; provide a detailed description of any animations or dynamic elements of the AR effect; and exclude descriptions of content present in the base video frame unless it relates to a location where the AR effect is applied.

In Example 12, the subject matter of Examples 8-11 includes, extracting text from at least one of the N frames from the base video with the AR effect applied using optical character recognition (OCR); and combining the generated caption, the OCR text, and metadata related to the AR effect, using a generative language model to produce a merged caption and content tags for the AR effect.

In Example 13, the subject matter of Examples 8-12 includes, generating word embeddings from the generated caption using a text encoder; storing the word embeddings in a database; and using the word embeddings for at least one of: retrieving similar augmented reality effects based on caption similarity, improving augmented reality effect search indexing, or enhancing augmented reality effect ranking in recommendation systems.

In Example 14, the subject matter of Examples 8-13 includes, training the large language model, wherein the training of the large language model comprises: providing training data comprising pairs of concatenated frames and corresponding human-labeled captions; processing the concatenated frames with the vision encoder to produce visual tokens; projecting the visual tokens into the language model token space to derive projected tokens; interleaving the projected tokens with text tokens representing instructions and captions to form input sequences; processing the input sequences using the large language model; computing a loss function for the large language model, wherein the loss function: uses a causal attention mask with a prefix for the visual tokens and instruction tokens; and computes loss only for predicted caption tokens and not for the instruction or visual tokens; and updating parameters of the large language model based on the computed loss to improve caption generation performance.

Example 15 is a system for generating a caption for a video with an augmented reality (AR) effect, the system comprising: means for sampling N frames from a base video and N corresponding frames from the base video with the AR effect applied to form N pairs of frames, wherein each pair of frames represents the same point in time; means for combining each pair of frames in the N pairs of frames into a concatenated frame to form N concatenated frames, each concatenated frame formed by positioning, side by side, a base video frame and a corresponding frame from the base video with the AR effect applied; means for processing the N concatenated frames with a vision encoder to produce visual tokens; means for projecting the visual tokens into a language model token space to derive projected tokens; means for reshaping the projected tokens from a one-dimensional representation to a two-dimensional representation; means for spatially downsampling the reshaped projected tokens to derive downsampled tokens; means for interleaving the downsampled tokens with text tokens to form an input sequence; means for processing the input sequence using a large language model to generate a caption describing the AR effect applied to the base video.

In Example 16, the subject matter of Example 15 includes, wherein the means for processing the N concatenated frames with a vision encoder comprises: means for processing the N concatenated frames using a hybrid vision encoder having a first component trained on diverse text-image data that accepts low resolution inputs and a second component trained on high-quality segmentation datasets that accepts high resolution inputs; wherein the hybrid vision encoder captures both global and local semantic understanding of the AR effect applied to the base video.

In Example 17, the subject matter of Examples 15-16 includes, wherein the means for processing the input sequence using the large language model comprises: means for processing the input sequence using a causal attention mask with a prefix; means for generating the caption by predicting tokens only for a portion of the input sequence representing the caption; and means of predicting an end-of-sentence token to determine when to stop generating the caption.

In Example 18, the subject matter of Examples 1-17 includes, wherein the means for interleaving the downsampled tokens with text tokens to form an input sequence comprises: means for including a text instruction that directs the large language model to: compare the base video frame and the corresponding frame with the AR effect applied in each concatenated frame; focus on describing the AR effect visible in the frame with the AR effect applied; provide a detailed description of any animations or dynamic elements of the AR effect; and exclude descriptions of content present in the base video frame unless it relates to a location where the AR effect is applied.

In Example 19, the subject matter of Examples 15-18 includes, the system further comprising: means for extracting text from at least one of the N frames from the base video with the AR effect applied using optical character recognition (OCR); and means for combining the generated caption, the OCR text, and metadata related to the AR effect, using a generative language model to produce a merged caption and content tags for the AR effect.

In Example 20, the subject matter of Examples 15-19 includes, the system further comprising: means for generating word embeddings from the generated caption using a text encoder; means for storing the word embeddings in a database; and means for using the word embeddings for at least one of: retrieving similar augmented reality effects based on caption similarity, improving augmented reality effect search indexing, or enhancing augmented reality effect ranking in recommendation systems.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A processor-implemented component performing a method for generating a caption for a video with an augmented reality (AR) effect, the method comprising:

sampling N frames from a base video and N corresponding frames from the base video with the AR effect applied to form N pairs of frames, wherein each pair of frames represents the same point in time, wherein N is an integer greater than or equal to 2;

combining each pair of frames in the N pairs of frames into a concatenated frame to form N concatenated frames, each concatenated frame formed by positioning, side by side, a base video frame and a corresponding frame from the base video with the AR effect applied;

processing the N concatenated frames with a vision encoder to produce visual tokens; projecting the visual tokens into a language model token space to derive projected tokens;

reshaping the projected tokens from a one-dimensional representation to a two-dimensional representation;

spatially downsampling the reshaped projected tokens to derive downsampled tokens;

interleaving the downsampled tokens with text tokens to form an input sequence; processing the input sequence using a large language model to generate a caption describing the AR effect applied to the base video.

2. The method of claim 1, wherein processing the N concatenated frames with a vision encoder comprises:

processing the N concatenated frames using a hybrid vision encoder having a first component trained on diverse text-image data that accepts low resolution inputs and a second component trained on high-quality segmentation datasets that accepts high resolution inputs;

wherein the hybrid vision encoder captures both global and local semantic understanding of the AR effect applied to the base video.

3. The method of claim 1, wherein processing the input sequence using the large language model comprises:

processing the input sequence using a causal attention mask with a prefix;

generating the caption by predicting tokens only for a portion of the input sequence representing the caption; and predicting an end-of-sentence token to determine when to stop generating the caption.

4. The method of claim 1, wherein interleaving the downsampled tokens with text tokens to form an input sequence comprises:

including a text instruction that directs the large language model to:

compare the base video frame and the corresponding frame with the AR effect applied in each concatenated frame;

focus on describing the AR effect visible in the frame with the AR effect applied;

provide a detailed description of any animations or dynamic elements of the AR effect; and exclude descriptions of content present in the base video frame unless it relates to a location where the AR effect is applied.

5. The method of claim 1, further comprising:

extracting text from at least one of the N frames from the base video with the AR effect applied using optical character recognition (OCR); and combining the generated caption, the OCR text, and metadata related to the AR effect, using a generative language model to produce a merged caption and content tags for the AR effect.

6. The method of claim 1, further comprising:

generating word embeddings from the generated caption using a text encoder;

storing the word embeddings in a database; and using the word embeddings for at least one of:

retrieving similar augmented reality effects based on caption similarity, improving augmented reality effect search indexing, or enhancing augmented reality effect ranking in recommendation systems.

7. The method of claim 1, further comprising training the large language model, wherein the training of the large language model comprises:

providing training data comprising pairs of concatenated frames and corresponding human-labeled captions;

processing the concatenated frames with the vision encoder to produce visual tokens;

projecting the visual tokens into the language model token space to derive projected tokens;

interleaving the projected tokens with text tokens representing instructions and captions to form input sequences;

processing the input sequences using the large language model;

computing a loss function for the large language model; and updating parameters of the large language model based on the computed loss to improve caption generation performance;

wherein the computed loss function comprises:

using a causal attention mask with a prefix for the visual tokens and instruction tokens; and computing loss only for predicted caption tokens and not for the instruction or visual tokens.

8. A system for generating a caption for a video with an augmented reality (AR) effect, the system comprising: at least one processor; and at least one non-volatile memory storage device storing instructions thereon, which, when executed by the at least one processor, cause the system to perform operations comprising:

sampling N frames from a base video and N corresponding frames from the base video with the AR effect applied to form N pairs of frames, wherein each pair of frames represents the same point in time, wherein N is an integer greater than or equal to 2;

combining each pair of frames in the N pairs of frames into a concatenated frame to form N concatenated frames, each concatenated frame formed by positioning, side by side, a base video frame and a corresponding frame from the base video with the AR effect applied;

processing the N concatenated frames with a vision encoder to produce visual tokens;

projecting the visual tokens into a language model token space to derive projected tokens;

reshaping the projected tokens from a one-dimensional representation to a two-dimensional representation;

spatially downsampling the reshaped projected tokens to derive downsampled tokens;

interleaving the downsampled tokens with text tokens to form an input sequence; processing the input sequence using a large language model to generate a caption describing the AR effect applied to the base video.

9. The system of claim 8, wherein processing the N concatenated frames with a vision encoder comprises:

processing the N concatenated frames using a hybrid vision encoder having a first component trained on diverse text-image data that accepts low resolution inputs and a second component trained on high-quality segmentation datasets that accepts high resolution inputs;

wherein the hybrid vision encoder captures both global and local semantic understanding of the AR effect applied to the base video.

10. The system of claim 8, wherein processing the input sequence using the large language model comprises:

processing the input sequence using a causal attention mask with a prefix;

generating the caption by predicting tokens only for a portion of the input sequence representing the caption; and predicting an end-of-sentence token to determine when to stop generating the caption.

11. The system of claim 8, wherein interleaving the downsampled tokens with text tokens to form an input sequence comprises:

including a text instruction that directs the large language model to:

compare the base video frame and the corresponding frame with the AR effect applied in each concatenated frame;

focus on describing the AR effect visible in the frame with the AR effect applied;

provide a detailed description of any animations or dynamic elements of the AR effect; and exclude descriptions of content present in the base video frame unless it relates to a location where the AR effect is applied.

12. The system of claim 8, further comprising:

extracting text from at least one of the N frames from the base video with the AR effect applied using optical character recognition (OCR); and combining the generated caption, the OCR text, and metadata related to the AR effect, using a generative language model to produce a merged caption and content tags for the AR effect.

13. The system of claim 8, further comprising:

generating word embeddings from the generated caption using a text encoder;

storing the word embeddings in a database; and using the word embeddings for at least one of:

retrieving similar augmented reality effects based on caption similarity, improving augmented reality effect search indexing, or enhancing augmented reality effect ranking in recommendation systems.

14. The system of claim 8, further comprising training the large language model, wherein the training of the large language model comprises:

providing training data comprising pairs of concatenated frames and corresponding human-labeled captions;

processing the concatenated frames with the vision encoder to produce visual tokens;

projecting the visual tokens into the language model token space to derive projected tokens;

interleaving the projected tokens with text tokens representing instructions and captions to form input sequences;

processing the input sequences using the large language model;

computing a loss function for the large language model; and updating parameters of the large language model based on the computed loss to improve caption generation performance;

wherein the computed loss function comprises:

using a causal attention mask with a prefix for the visual tokens and instruction tokens; and computing loss only for predicted caption tokens and not for the instruction or visual tokens.

15. A system for generating a caption for a video with an augmented reality (AR) effect, the system comprising:

means for sampling N frames from a base video and N corresponding frames from the base video with the AR effect applied to form N pairs of frames, wherein each pair of frames represents the same point in time, wherein N is an integer greater than or equal to 2;

means for combining each pair of frames in the N pairs of frames into a concatenated frame to form N concatenated frames, each concatenated frame formed by positioning, side by side, a base video frame and a corresponding frame from the base video with the AR effect applied;

means for processing the N concatenated frames with a vision encoder to produce visual tokens;

means for projecting the visual tokens into a language model token space to derive projected tokens;

means for reshaping the projected tokens from a one-dimensional representation to a two-dimensional representation;

means for spatially downsampling the reshaped projected tokens to derive downsampled tokens;

means for interleaving the downsampled tokens with text tokens to form an input sequence;

means for processing the input sequence using a large language model to generate a caption describing the AR effect applied to the base video.

16. The system of claim 15, wherein the means for processing the N concatenated frames with a vision encoder comprises:

means for processing the N concatenated frames using a hybrid vision encoder having a first component trained on diverse text-image data that accepts low resolution inputs and a second component trained on high-quality segmentation datasets that accepts high resolution inputs;

wherein the hybrid vision encoder captures both global and local semantic understanding of the AR effect applied to the base video.

17. The system of claim 15, wherein the means for processing the input sequence using the large language model comprises:

means for processing the input sequence using a causal attention mask with a prefix;

means for generating the caption by predicting tokens only for a portion of the input sequence representing the caption; and means for predicting an end-of-sentence token to determine when to stop generating the caption.

18. The system of claim 15, wherein the means for interleaving the downsampled tokens with text tokens to form an input sequence comprises: means for including a text instruction that directs the large language model to:

compare the base video frame and the corresponding frame with the AR effect applied in each concatenated frame;

focus on describing the AR effect visible in the frame with the AR effect applied;

provide a detailed description of any animations or dynamic elements of the AR effect; and exclude descriptions of content present in the base video frame unless it relates to a location where the AR effect is applied.

19. The system of claim 15, the system further comprising:

means for extracting text from at least one of the N frames from the base video with the AR effect applied using optical character recognition (OCR); and means for combining the generated caption, the OCR text, and metadata related to the AR effect, using a generative language model to produce a merged caption and content tags for the AR effect.

20. The system of claim 15, the system further comprising:

means for generating word embeddings from the generated caption using a text encoder;

means for storing the word embeddings in a database; and means for using the word embeddings for at least one of:

retrieving similar augmented reality effects based on caption similarity, improving augmented reality effect search indexing, or enhancing augmented reality effect ranking in recommendation systems.

* * * * *